United States Patent [19]

Weaver et al.

[11] 4,456,551

[45] Jun. 26, 1984

[54] AZO DYES FROM 2-AMINO-5-ALKYLTHIO-1,3,4-THIADIAZOLES AND N-ACYLOXYALKYL-M-ACYLAMIDOANILINES

[75] Inventors: Max A. Weaver; Clarence A. Coates, Jr., both of Kingsport, Tenn.

[73] Assignee: Eastman Kodak Company, Rochester, N.Y.

[21] Appl. No.: 512,867

[22] Filed: Jul. 11, 1983

Related U.S. Application Data

[63] Continuation-in-part of Ser. No. 315,106, Oct. 26, 1981, abandoned.

[51] Int. Cl.³ .................. C09B 29/039; C09B 29/09; D06P 1/18; D06P 3/54
[52] U.S. Cl. ...................................... 260/158; 548/141
[58] Field of Search .......................................... 260/158

[56] References Cited

U.S. PATENT DOCUMENTS 3,657,187 4/1972 Weaver et al. .................. 260/158
3,770,370 11/1973 Weaver et al. .................. 260/158 X
3,775,049 11/1973 Wolfrum et al. ................ 260/158 X

*Primary Examiner*—Floyd D. Higel
*Attorney, Agent, or Firm*—Donald W. Spurrell; Daniel B. Reece, III

[57] ABSTRACT

Disclosed are novel azo dyes from 2-amino-5-alkylthio-1,3,4-thiadiazoles and N-acyloxyalkyl-m-acylamidoanilines. These dyes are useful for dyeing synthetic hydrophobic fibers and particularly polyester. The dyes have the general formula:

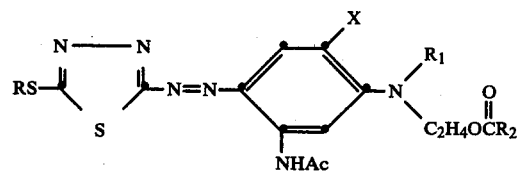

wherein R is alkyl; X is hydrogen, or alkyl; $R_1$ is hydrogen, alkyl, aralkyl or

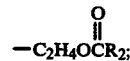

$R_2$ is alkyl, aryl, aralkyl, cycloalkyl, alkylamino, or arylamino; and Ac is formyl or alkanoyl; and wherein R and the alkyl, alkylene, aryl and cycloalkyl moieties of $R_2$ and the alkanoyl moiety of Ac may be substituted with a large variety of groups such as —OH, OOC-alkyl, —COO—alkyl, succinimido, phthalimido, alkoxy, carbamoyl and the like.

8 Claims, No Drawings

AZO DYES FROM 2-AMINO-5-ALKYLTHIO-1,3,4-THIADIAZOLES AND N-ACYLOXYALKYL-M-ACYLAMIDOANILINES

This is a continuation-in-part application of Ser. No. 315,106 filed Oct. 26, 1981, and now abandoned.

This invention concerns novel azo dyes from 2-amino-5-organothio-1,3,4-thiadiazoles and N-acyloxyalkyl-m-acylamidonilines. These dyes are useful for dyeing synthetic hydrophobic fibers and particularly polyester.

The invention more particularly concerns dyes of the general formula:

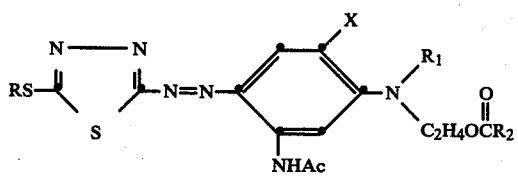

wherein R is alkyl, aryl or cycloalkyl; X is hydrogen, or alkyl; $R_1$ is hydrogen, alkyl, aralkyl or

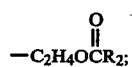

$R_2$ is alkyl, aryl, aralkyl, cycloalkyl, alkylamino, or arylamino; and Ac is formyl or alkanoyl; and wherein the alkyl, aryl and cycloalkyl moieties of R and $R_2$ and the alkanoyl moiety may be substituted where appropriate with 1–3 groups independently selected from alkyl, aryl, cycloalkyl, —OH, —OOC-alkyl, —COO-alkyl, succinimido, phthalimido, alkoxy, carbamoyl, alkylcarbamoyl, dialkylcarbamoyl, alkanoylamino, halogen, phenoxy and benzoyloxy; and wherein each of the above alkyl, alkylene, alkanoyl and alkoxy moieties are straight or branched and contain from one to six carbons.

These dyes produce very bright scarlet, red and pink shades on hydrophobic fibers, and exhibit improvements in one or more of such properties as fastness to light, oxides of nitrogen, wash, ozone, sublimation, perspiration and crock, dyeability including low-energy level, migration, leveling, pH stability, reduced solvent spotting, e.g., with perchloroethylene, and build, over such prior art dyes as disclosed in U.S. Pat. Nos. 3,657,215 and 3,770,370.

The present azo moieties and couplers are prepared by procedures well known in the art. For example the interemediate 2-amino-1,3,4-thiadiazoles III may be prepared by reacting 2-amino-5-mercapto-1,3,4-thiaziazole (I) with the appropriate halides II as follows:

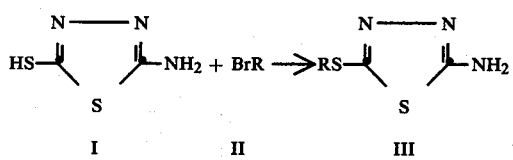

Compounds III are then diazotized and coupled in the normal manner to give the above dyes.

The invention is further illustrated by reference to the following examples of some preferred compounds.

EXAMPLE 1

Preparation of 2-Amino-5-benzylthio-1,3,4-thiadiazole

A mixture of 2-amino-5-mercapto-1,3,4-thiadiazole (39.9 g), potassium carbonate (41.4 g), α-chlorotoluene (38.0 g), and N,N-dimethylformamide (180 ml) is heated for 1.5 hours on a steam bath. The reaction mixture is drowned into water (1,000 ml) and the product collected by filtration and air dried. The crude product is recrystallized from ethanol and melts at 154°–156° C.

EXAMPLE 2

Preparation of 2-Amino-5-succinimido ethylthio-1,3,4-thiaziazole

A mixture of 2-amino-5-mercapto-1,3,4-thiadiazole (53.2 g), N-2-chloroethyl succinimide (64.8 g), potassium iodide (2.0 g), potassium carbonate (28.0 g), and N,N-dimethylformamide (140 ml) is stirred and heated for two hours on a steam bath. The reaction mixture is drowned into water (2,000 ml) and the product collected by filtration and air dried. After recrystallization from methyl Cellosolve (200 ml), the product melts at 177°–179° C.

EXAMPLE 3

Preparation of 2-Amino-5-ethoxycarbonyl methylthio-1,3,4-thiadiozale

A mixture of 2-amino-5-mercapto-1,3,4-thiadiazole (66.5 g) and ethanol are mixed and heated to reflux. Ethyl chloroacetate (67.2 g) is added dropwise and heated at reflux for four hours. A solution results after one hour of heating and four hundred ml of ethanol is distilled off the reaction mixture. While the reaction mixture is still hot 150 ml of water are added. The reaction mixture is cooled to 50° C. and a solution of sodium carbonate (26.5 g) in 200 ml of water is gradually added with stirring to cool to room temperature. The crystalline product is collected by filtration and washed with water and air dried. The product melts at 93°–94° C.

EXAMPLE 4

Preparation of Azo Dyes

To conc. sulfuric acid (25 ml) sodium nitrite (3.6 g) is carefully added, allowing the temperature to rise. The solution is cooled and 50 ml of 1:5 acid (1 part propionic acid:5 parts acetic acid) is added below 20° C. The mixture is stirred and cooled and 2-amino-5-succinimidoethylthio-1,3,4-thiadiazole (12.9 g) is added, followed by addition 1:5 acid (50 ml), all at 0°–5° C. Diazotization is completed by stirring for two hours at 0°–5° C. A portion of the diazonium salt solution containing 0.005 moles of the diazonium salt is added to a chilled solution of each of the following couplers dissolved in 1:5 acid (20 ml) containing 0.005 moles of the coupler:

N-2-Acetoxyethyl-N-ethyl-m-acetamidoaniline
N-2-Acetoxyethyl-2-methyl-5-acetamidoaniline
N-2-Acetoxyethyl-N-butyl-m-formanidoaniline
N,N-Bis-acetoxyethyl-m-acetamidoaniline
N-Ethyl-N-2-propionoxyethyl-m-acetamidoaniline
N-2-Acetoxyethyl-N-methyl-m-benzamidoaniline
N-2-Acetoxyethyl-N-ethyl-m-cyclohexanoylaniline
N-2-Acetoxyethyl-N-methyl-m-acetamidoaniline
N-2-Acetoxyethyl-N-benzyl-m-acetamidoaniline N-2-Propionoxyethyl-2-methyl-5-acetamidoaniline Ammonium acetate is added to each coupling mixture until the pH exceeds 3.5. After allowing to couple for one hour, the mixtures are drowned with water, the dyes isolated by filtration, washed with water, dried, and reslurried in hot methyl alcohol for purification. These dyes are used to color polyester material on a test scale as follows:

The dye compound (16.7 mg.) is dispersed in about 5 ml. of 2-methoxyethanol. 2% Owf of Igepon T-51 and 2% owf of sodium lignin-sulfonate from a premixed solution of the two is added with stirring. The volume of the bath is brought to a 30:1 bath ratio and the bath set at 90° F. About 5 g/liter of bath of ortho-phenylphenol (Carolid), 1% owf Calgon, 1% acetic acid, and 1% monosodium phosphate are added to the bath. A wet out fabric sample of Dacron 56 is placed in the dyepot containing the above system and the temperature is brought up to the boil at about 2° F./min. and held for 30 minutes. The dyed swatch is removed from the cooled bath, rinsed with water, scoured for 20 minutes at about 80° C. in a solution containing 1 g./l. neutral soap and 1 g./l. sodium carbonate and rinsed again. The dyed swatch is dried in a forced air oven at 250° F. and heatset at 350° F. for 5 minutes.

The following table gives additional exemplary dyes of the present invention.

TABLE I

| Ex. No. | R | X | Ac | $R_1$ | $R_2$ |
|---|---|---|---|---|---|
| 5 | —CH$_3$ | H | COCH$_3$ | C$_2$H$_5$ | CH$_3$ |
| 6 | —C$_2$H$_5$ | " | " | " | C$_6$H$_5$ |
| 7 | CH$_2$—⟨furan⟩—COCH$_3$ | " | COC$_2$H$_5$ | CH$_3$ | CH$_3$ |
| 8 | —CH$_2$CO$_2$CH$_3$ | " | COCH(CH$_3$)$_2$ | C$_4$H$_9$-n | C$_6$H$_{11}$ |
| 9 | —CH$_2$CH$_2$CO$_2$C$_2$H$_5$ | " | COCH$_3$ | CH$_2$C$_6$H$_5$ | CH$_2$C$_6$H$_5$ |
| 10 | —CH$_2$CON(C$_2$H$_5$)$_2$ | " | " | C$_2$H$_5$ | C$_2$H$_5$ |
| 11 | —CH$_2$CH$_2$N(COCH$_2$)$_2$ | " | " | " | CH$_3$ |
| 12 | —CH$_2$CH$_2$OCOCH$_3$ | CH$_3$ | COCH$_2$CN | H | |
| 13 | —CH$_2$CH$_2$OH | " | COCH$_2$OCH$_3$ | " | |
| 14 | —CH$_2$CH$_2$NHCOCH$_3$ | " | COCH$_2$Cl | | |
| 15 | —CH$_2$—⟨thiophene⟩ | " | COCH$_3$ | | |
| 16 | —CH$_2$—⟨furan⟩ | H | COC$_2$H$_5$ | CH$_2$CH$_3$ | |
| 17 | —C$_2$H$_5$ | CH$_3$ | COCH$_3$ | CH$_2$CH$_2$OCCH$_3$ (O) | |
| 18 | " | H | " | CH$_2$CH$_2$OCC$_2$H$_5$ (O) | C$_2$H$_5$ |
| 19 | " | " | " | C$_2$H$_5$ | NHC$_2$H$_5$ |
| 20 | " | " | " | " | NHC$_6$H$_5$ |
| 21 | ⟨furan⟩ | " | " | C$_2$H$_4$OCCH$_3$ | CH$_3$ |
| 22 | ⟨furan⟩—CH$_3$ | " | " | C$_2$H$_4$OCNHC$_2$H$_5$ | C$_2$H$_5$ |
| 23 | ⟨furan⟩—OCH$_3$ | " | COC$_6$H$_5$ | CH$_2$CH$_2$C$_6$H$_5$ | |

TABLE I-continued

Structure:

N—N, RS—C(S)—C—N=N—[benzene ring with X, NHAc, and N(R₁)(CH₂CH₂OCR₂(=O))]

| Ex. No. | R | X | Ac | R₁ | R₂ |
|---|---|---|---|---|---|
| 24 | —CH₂CH₂—(furyl) | " | COC₆H₁₁ | C₆H₅ | CH₃ |
| 25 | —CH₂CH₂OC₂H₅ | " | COCH₂C₆H₅ | C₂H₅ | " |
| 26 | —CH₂CH₂N(phthalimido) | " | COH | " | " |
| 27 | —CH₂CH₂COCH₃ | " | COCH₃ | " | " |
| 28 | —C₂H₅ | CH₃ | COCH₃ | H | " |
| 29 | —CH(CH₃)₂ | H | " | C₂H₄OC(=O)—CH₃ | " |
| 30 | —CH₂CH₂CH₂CH₃ | " | " | " | " |
| 31 | —CH₂CH₂OC(=O)—(furyl) | " | " | " | " |
| 32 | —(thienyl) | " | " | " | " |

The invention has been described in detail with particular reference to preferred embodiments thereof, but it will be understood that variations and modifications can be effected within the spirit and scope of the invention.

We claim:

1. A compound having the formula:

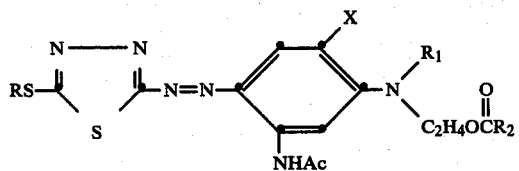

wherein R is alkyl; X is hydrogen, or alkyl; R₁ is hydrogen, alkyl, aralkyl or

R₂ is alkyl, aryl, aralkyl, cycloalkyl, alkylamino, or arylamino; and Ac is formyl or alkanoyl; and wherein R and the alkyl, aryl and cycloalkyl moieties of R₂ and the alkanoyl moiety of Ac are unsubstituted or substituted with 1–3 groups independently selected from alkyl, aryl, cycloalkyl, —OH, OOC-alkyl, —COO-alkyl, succinimido, phthalimido, alkoxy, carbamoyl, alkylcarbamoyl, dialkylcarbamoyl, alkanoylamino, halogen, phenoxy and benzoyloxy.

2. A compound of claim 1 wherein R is methyl, ethyl, benzyl, succinimidoethyl or ethoxycarbonylmethyl; R₁ is ethyl, propyl, butyl, or benzyl; R₂ is methyl, ethyl, ethylamino, benzyl, phenylamino or cyclohexyl; Ac is acetyl, propionyl, benzoyl, formyl or cyclohexanoyl; and X is methyl.

3. The compound of claim 1 having the formula:

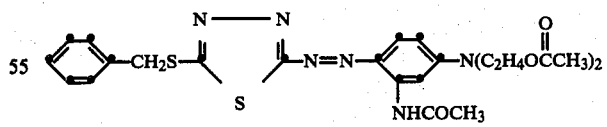

4. The compound of claim 1 having the formula:

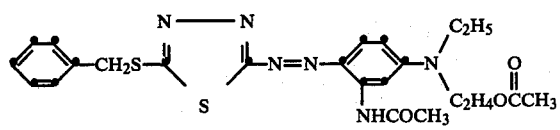

5. The compound of claim 1 having the formula:

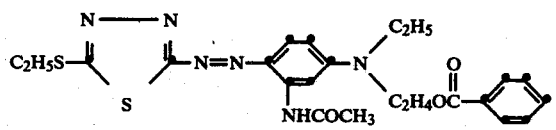
6. The compound of claim 1 having the formula:
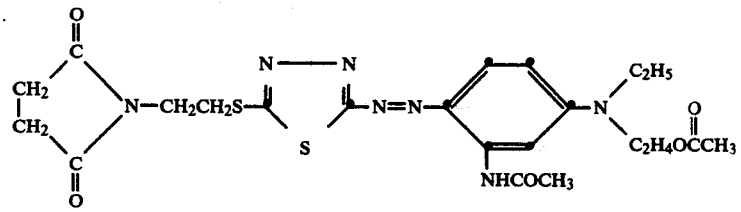
7. The compound of claim 1 having the formula:
8. A compound of claim 1 wherein R is alkyl; $R_1$ is ethyl, propyl, butyl, or benzyl; $R_2$ is alkyl or phenyl; Ac is acetyl or propionyl; and X is hydrogen.
* * * * *